(12) United States Patent
Berry et al.

(10) Patent No.: US 7,991,659 B2
(45) Date of Patent: Aug. 2, 2011

(54) ACCOUNTING DATA RETRIEVAL METHOD AND SYSTEM

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 12/029,025

(22) Filed: Feb. 11, 2008

(65) Prior Publication Data

US 2009/0204516 A1 Aug. 13, 2009

(51) Int. Cl.
*G07B 17/00* (2006.01)
*G07F 19/00* (2006.01)
*A01K 5/02* (2006.01)
*G06F 17/50* (2006.01)
*G07F 7/10* (2006.01)

(52) U.S. Cl. ............... 705/30; 705/29; 705/33
(58) Field of Classification Search .......... 705/30, 705/29, 33
See application file for complete search history.

(56) References Cited

U.S. PATENT DOCUMENTS

| | | | |
|---|---|---|---|
| 5,758,327 A * | 5/1998 | Gardner et al. | 705/26 |
| 6,257,774 B1 | 7/2001 | Stack | |
| 6,732,079 B1 * | 5/2004 | Kintner et al. | 705/8 |
| 6,910,018 B1 * | 6/2005 | Okada et al. | 705/26 |
| 7,155,403 B2 | 12/2006 | Cirulli et al. | |
| 7,184,987 B2 | 2/2007 | Welt | |
| 7,200,569 B2 | 4/2007 | Gallagher et al. | |
| 7,280,973 B1 | 10/2007 | Hack et al. | |
| 2002/0059122 A1 * | 5/2002 | Inoue et al. | 705/29 |
| 2004/0267629 A1 * | 12/2004 | Herrmann et al. | 705/26 |

* cited by examiner

*Primary Examiner* — Matthew S Gart
*Assistant Examiner* — Ig T An
(74) *Attorney, Agent, or Firm* — Schmeiser, Olsen & Watts; John R. Pivnichny

(57) ABSTRACT

An accounting method and system. The method includes determining by a computing system, that a second entity is dependent on a first entity for a specified time period. The computing system generates a first list comprising initially allowable purchase types list for items available for purchase by a user. The computing system generates a modified list from the first list. The computing system receives from the user, a selection for a purchase type from the modified list. The computing system presents an accounting data input form to the user. The computing system places the purchase type, a selected general ledger account, and a selected organization into the accounting data input form. The computing system stores the accounting data input form that includes the purchase type, the selected general ledger account, and the selected organization.

16 Claims, 3 Drawing Sheets

ACCOUNTING DATA RETRIEVAL METHOD AND SYSTEM

FIELD OF THE INVENTION

The present invention relates to a method and associated system for retrieving accounting data for purchases associated with multiple entities.

BACKGROUND OF THE INVENTION

Accepting input data associated with two companies typically comprises a complicated and inefficient process with little flexibility. A user requesting items may not have the ability to associate purchasing information with the two companies. The user may be limited by an inability to generate associations. Accordingly, there exists a need in the art to overcome at least some of the deficiencies and limitations described herein above.

SUMMARY OF THE INVENTION

The present invention provides an accounting method comprising:

enabling, by a computing system for a user, access to said computing system, wherein said computing system comprises a memory system, wherein said user is associated with a first entity and a second entity, and wherein said first entity is associated with said second entity, and wherein said memory system comprises data associated with said first entity and said second entity;

determining, by said computing system, that said second entity is dependent on said first entity for a specified time period;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, said second list associated with said second entity;

presenting, by said computing system to said user, said second list;

receiving, by said computing system from said user, a second selection for a first general ledger account from said second list, said first general ledger account associated with said first purchase type and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form;

storing, by said computing system in said memory system, said accounting data input form comprising said first purchase type, said first selection, said second selection, and said third selection.

The present invention provides a computing system comprising a processor coupled to a computer-readable memory unit, said memory unit comprising instructions that when executed by the processor implement an accounting method, said method comprising:

enabling, by said computing system for a user, access to said computing system, wherein said user is associated with a first entity and a second entity, and wherein said first entity is associated with said second entity, and wherein said computer-readable memory unit comprises data associated with said first entity and said second entity;

determining, by said computing system, that said second entity is dependent on said first entity for a specified time period;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, said second list associated with said second entity;

presenting, by said computing system to said user, said second list;

receiving, by said computing system from said user, a second selection for a first general ledger account from said second list, said first general ledger account associated with said first purchase type and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form;

storing, by said computing system in said computer-readable memory unit, said accounting data input form comprising said first purchase type, said first selection, said second selection, and said third selection.

The present invention provides a computer program product, comprising a computer readable medium comprising a computer readable program code embodied therein, said computer readable program code adapted to implement an accounting method within a computing system comprising a computer-readable memory unit, said method comprising:

enabling, by said computing system for a user, access to said computing system, wherein said user is associated with a first entity and a second entity, and wherein said first entity is associated with said second entity, and wherein said computer-readable memory unit comprises data associated with said first entity and said second entity;

determining, by said computing system, that said second entity is dependent on said first entity for a specified time period;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules data;

generating, by said computing system from said data, a second list comprising a plurality of allowable general ledger accounts, said second list associated with said second entity;

presenting, by said computing system to said user, said second list;

receiving, by said computing system from said user, a second selection for a first general ledger account from said second list, said first general ledger account associated with said first purchase type and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form;

storing, by said computing system in said computer-readable memory unit, said accounting data input form comprising said first purchase type, said first selection, said second selection, and said third selection.

The present invention provides a process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing an accounting method, said method comprising:

enabling, by said computing system for a user, access to said computing system, wherein said user is associated with a first entity and a second entity, and wherein said first entity is associated with said second entity, and wherein said computer-readable memory unit comprises data associated with said first entity and said second entity;

determining, by said computing system, that said second entity is dependent on said first entity for a specified time period;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, said second list associated with said second entity;

presenting, by said computing system to said user, said second list;

receiving, by said computing system from said user, a second selection for a first general ledger account from said second list, said first general ledger account associated with said first purchase type and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form;

storing, by said computing system in said computer-readable memory unit, said accounting data input form comprising said first purchase type, said first selection, said second selection, and said third selection.

The present invention advantageously provides a simple method and associated system capable of accepting input data associated with two companies.

DETAILED DESCRIPTION OF THE INVENTION

Figure 1:
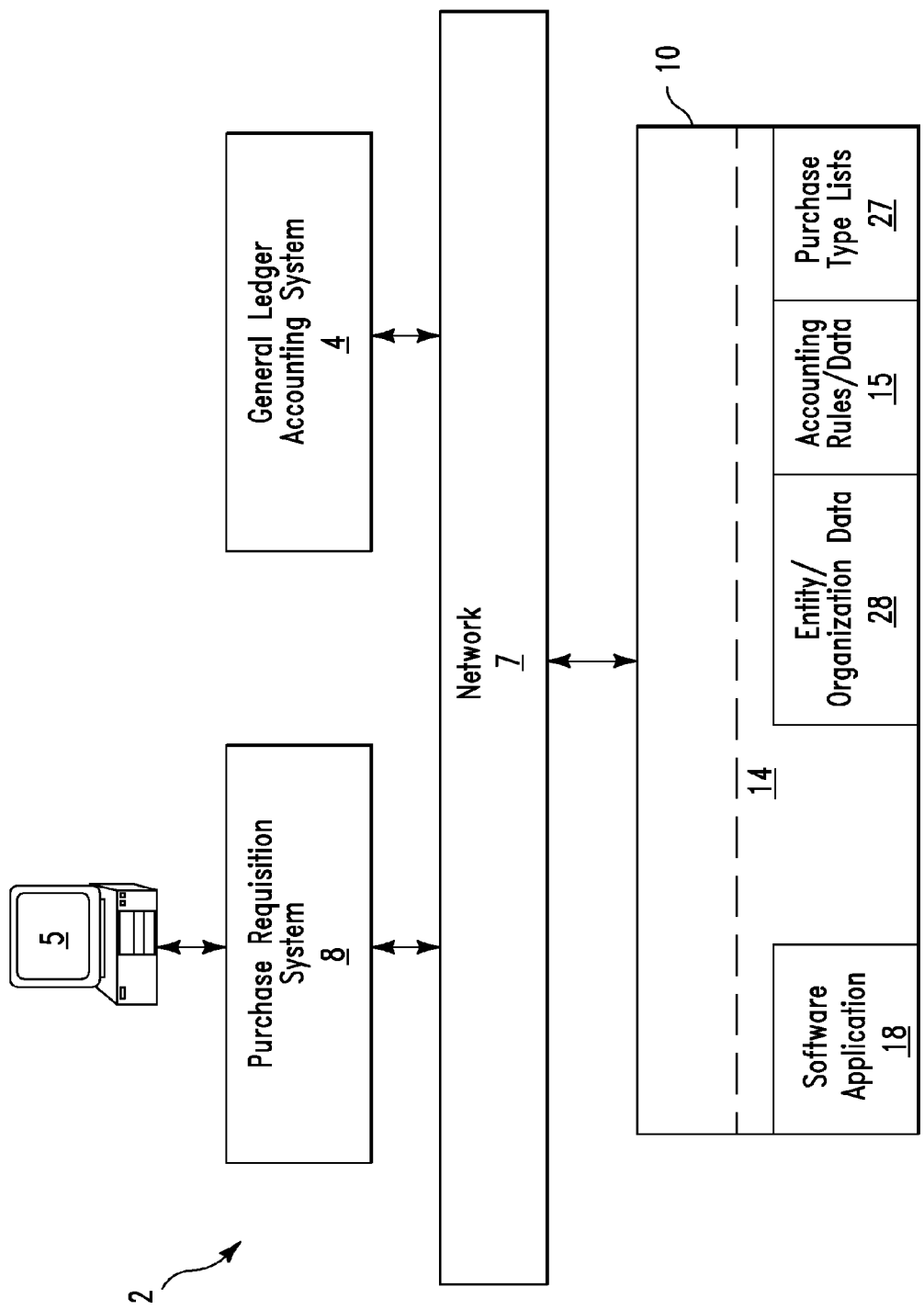
FIG. 1 illustrates an accounting system for retrieving accounting data associated with a governing entity and a dependent entity, in accordance with embodiments of the present invention.

FIG. 1 illustrates an accounting system 2 for retrieving accounting data associated with a governing entity and a dependent entity, in accordance with embodiments of the present invention. A dependent entity is defined herein as an entity (e.g., a corporation, a company, etc) that relies on an originating entity (e.g., a governing entity) for its day to day operations and must continue to use computing services, application systems, and underlying business processes of the originating entity until the dependent entity may establish or migrate to its own systems. For example, a company A (e.g., a computer monitor company) has been divested or sold from a governing company B (e.g., a computer manufacturer) to another company C (e.g., a television manufacturer). Employees that were formally employed by company B are currently employed by company C but must rely on company B's applications for day to day business operations for a transition period to ensure uninterrupted production. During this transition period, company A is considered to be a dependent company or entity.

System 2 allows the dependent entity to use an accounting process or methodology belonging to the governing entity. An entity (e.g., corporations) may comprise multiple organizations (e.g., multiple internal companies or entities). As an entity hones its business focus, some of the organizations within the entity may be sold to other entities. The process of divesting these organizations (or entities) may comprise scenarios where employees of the original entity (i.e., a governing entity) are currently employed by the divested organization (i.e., dependent entity). The aforementioned employees (i.e., for dependent entity) may be required to continue use (i.e., for a specified time period) of computing systems associated with the original entity (i.e., a governing entity). System 2 comprises a software application 18 for supporting this transition by enabling accounting data to be retrieved uninterrupted with new requirements that meet the needs of the governing entity and the dependent entity. System 2 allows an employee of a dependent entity to provide accounting information for purchases that satisfy the governing entity's accounting requirements and meet different/new accounting requirements associated with the dependent entity. The governing entity and the dependent entity each define the following accounting requirements/rules:

1. A set of general ledger (GL) accounts that will be used when posting financial data to a general ledger and a set of legal entities (e.g., companies) responsible for those charges.
2. Types of purchases which may be used (e.g., expense, capital, etc), scenarios that apply to various purchases (e.g., when expense applies vs. capital), and rules that govern which scenario is appropriate for a given purchase.
3. Segments of an entity whose profits and losses are to be tracked specifically.

System 2 of FIG. 1 comprises input/output (I/O) device 5, a purchase requisition system 8, and a general ledger accounting system 4 connected to a computing system 10 through a network 7. Purchase requisition system 8 is used by a user (i.e., via I/O device 5) for generating purchase orders for a dependent entity. General ledger accounting system 4 retrieves purchasing information and accounting data from computing system 10 for processing. I/O device 5 may comprise any type of I/O device such as, inter alia, a notebook computer, a desktop computer, a personal digital assistant (PDA), etc. I/O device 5 is used by a user selecting items or merchandise available for purchase.

Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14. Memory system 14 comprises software application 18, entity/organization data 28 (e.g., data defining: a governing entity, a dependent entity, etc), accounting rules/data 15 (e.g., data associated with: purchases, purchase types, rules for making purchases, accounting input forms, etc), and purchase type lists 27.

System 2 is used to retrieve accounting data associated with a governing entity and a dependent entity using the following steps:
1. A purchase requisition (or other document/transaction requiring accounting) is transmitted from a requester (i.e., a user) via purchasing requisition system 8 to computing system 10. The purchase requisition may include an identifier for the requester. For example, an identifier may comprise smithjr34@dependententity.com.
2. Software application 18 enables all dependant entity rules and logic.
3. Software application 18 obtains an identifier for the dependent entity that employs the requester.
4. Software application 18 obtains an identifier for the governing entity that defines the accounting policies to which the dependent entity must adhere to.
5. Software application 18 generates an initial list of allowable purchase types. Only those purchase types configured for the governing entity are included.
6. Software application 18 generates a modified list of allowable purchase types from the initial list of allowable purchase types. The set of purchase types configured in the modified list are sensitive to dependant entity rules.
7. Software application 18 allows the requester to select a purchase type from the modified list.
8. Software application 18 selects and presents an accounting data input form to the requester.
9. Software application 18 generates a list of valid general ledger (GL) account Ids (i.e., account numbers) from which the requester may select one.
10. Software application 18 presents a list of all data elements that must be provided by the requester.
11. Software application 18 allows the governing entity to define profit centers that represent an organizational structure of a portion of the dependant corporation within the scope of the divestiture.
12. Software application 18 determines whether or not a charge to company must be selected by the requester. A charge to company is a legal entity that is ultimately liable for the charges of the purchases regardless of which entity was used to represent the initial purchase from a supplier.
13. Data is captured that limits the list of charge to companies from which a requester may choose based on their employing entity.
14. All retrieved accounting information is then returned to purchase requisition system 8.

The following description (steps) illustrates an example of implementation for retrieving accounting data associated with a governing entity and a dependent entity:
1. Employee X (i.e., a former employee of governing Corporation A and a current employee of dependent Corporation B) uses purchase requisition system 8 to generate a purchase requisition for a flash memory USB drive.
2. During a check-out step, purchase requisition system 8 invokes/enables software application 18 to obtain any required accounting information.
3. Purchase requisition system 8 determines whether employee X is employed by Corporation A or Corporation B.
4. Software application 18 determines that employee X belongs to corporation B that is dependent on corporation A for its operation and obtains accounting rule configuration defined by and for corporation A.

5. Software application 18 refines these rules by obtaining additional rules (i.e., optionally if defined) that are to be applied to employees of the dependant corporation B.

Figure 2:
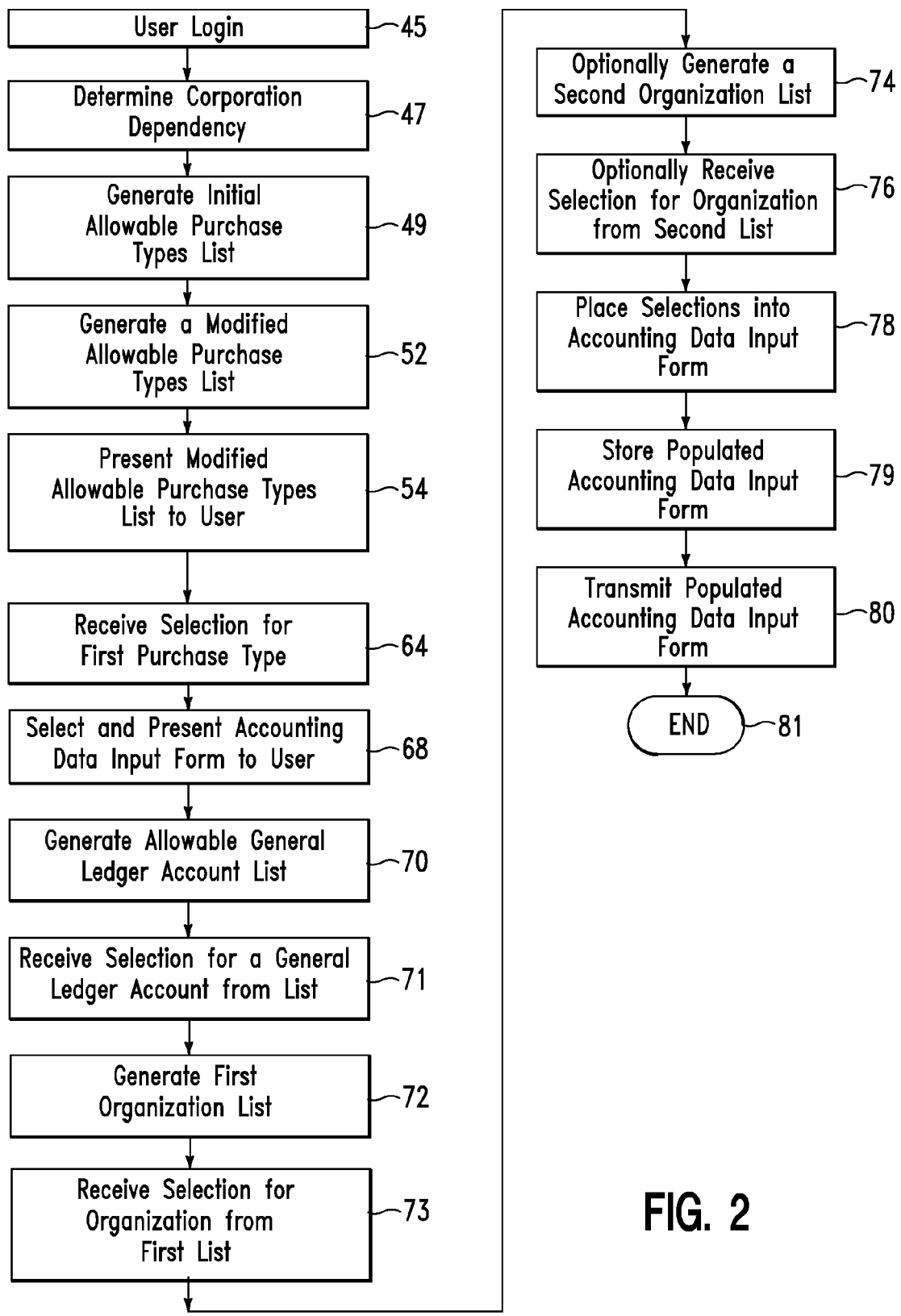
FIG. 2 illustrates a flowchart describing an algorithm used by the system of FIG. 1 for retrieving accounting data associated with a governing entity and a dependent entity, in accordance with embodiments of the present invention.

FIG. 2 illustrates a flowchart describing an algorithm used by system 2 of FIG. 1 for retrieving accounting data associated with a governing entity and a dependent entity, in accordance with embodiments of the present invention. In step 45, a user (i.e., a former employee of entity A and a current employee of entity B) logs into and accesses computing system 10 as a means to input accounting data for purchases made. In step 47, computing system 10 determines that entity B is dependent on entity A for the use of its systems during a transition period. For example, computing system 10 may determine that employees of entity B must comply with accounting requirements defined by entity A. In step 49, computing system 10 determines a first (initial) list of allowable purchase types based on a purchase made and configuration data defined by entity A. In step 52, computing system 10 modifies the first list (i.e., creating a modified purchase type list) based on configuration data defined by entity A regarding purchases made by the employee of entity B. In step 54, the modified purchase type list generated in step 52 is presented to the user. In step 64, the user selects a purchase type from the modified list. In step 68, computing system 10 selects an appropriate accounting data input form for the user to complete. The selection of the accounting data input form is associated with the selected purchase type from step 64 and the corporation dependency determined in step 47. Additionally, (i.e., in step 68) the accounting data input form is presented to the user. In step 70, computing system 10 generates a list of allowable general ledger (GL) accounts. In step 71, the user must select a first general ledger account from the list. The selection is associated with a purchase made and entity A configuration. Computing system 10 may optionally modify the list of allowable general ledger (GL) accounts based on a configuration associated with entity B. In step 72, computing system 10 generates a first list of organizations (e.g., profit centers) configured by entity A, that represent entity B. In step 73, the user selects a first organization from the first list of organizations. In optional step 74, computing system 10 generates a second list comprising a set or subset of organizations defined by entity A and associated with the entity B dependency. In optional step 76, the user selects an organization from the second list. In step 78, computing system 10 places all user selections into the selected accounting data input form. In step 79, the populated accounting data input form is stored in computing system 10. In step 80, the populated accounting data input form is transmitted to general ledger account system 4 for processing and the process terminates in step 81.

Figure 3:
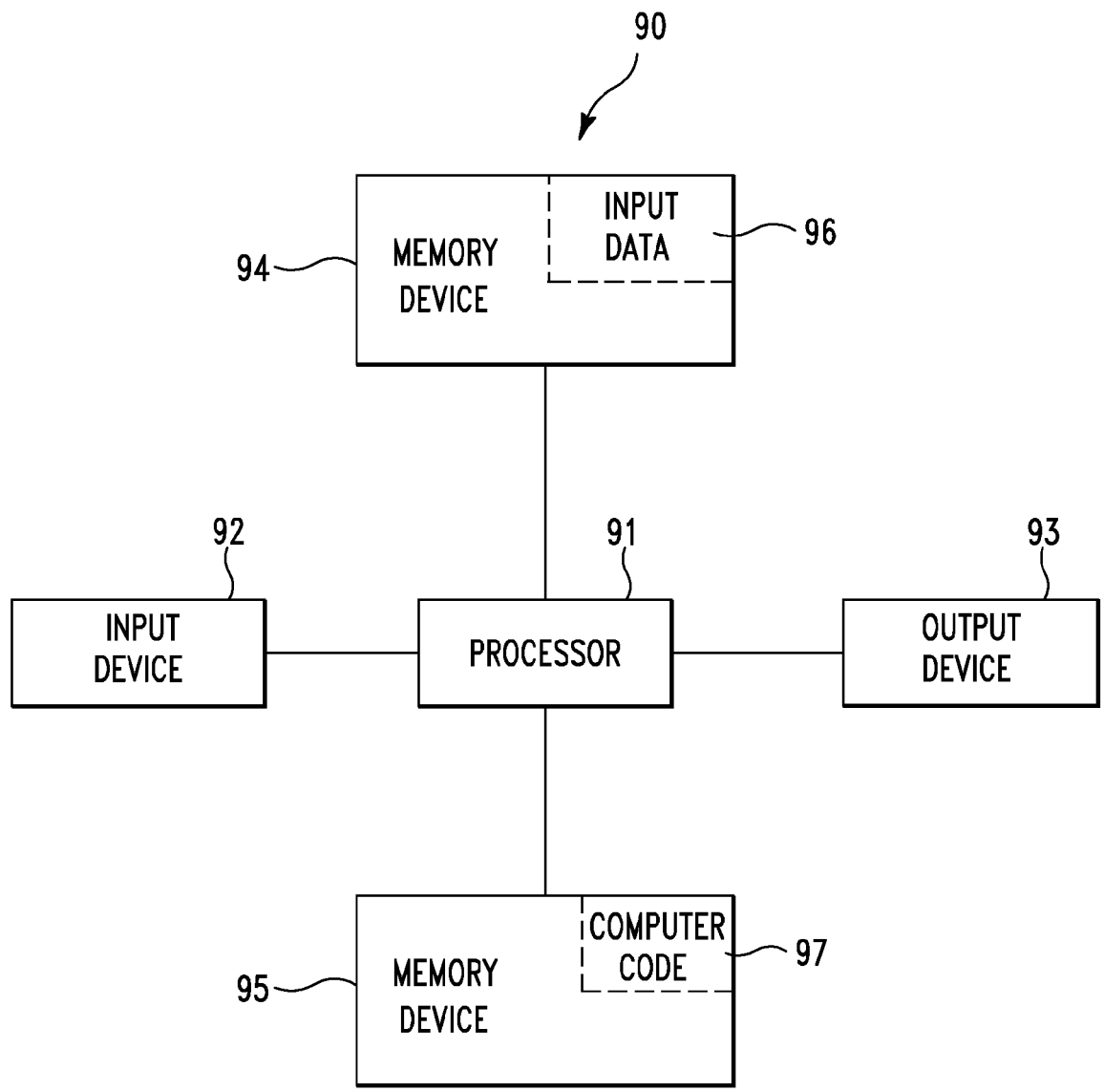
FIG. 3 illustrates a computer apparatus used for retrieving accounting data associated with a governing entity and a dependent entity, in accordance with embodiments of the present invention.

FIG. 3 illustrates a computer apparatus 90 (e.g., computing system 10 of FIG. 1) used for retrieving accounting data associated with a governing entity and a dependent entity, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for retrieving accounting data associated with a governing entity and a dependent entity. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to retrieve accounting data associated with a governing entity and a dependent entity. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for retrieving accounting data associated with a governing entity and a dependent entity. In another embodiment, the invention provides a business method that performs the process steps of the invention on a subscription, advertising, and/or fee basis. That is, a service provider, such as a Solution Integrator, could offer to retrieve accounting data associated with a governing entity and a dependent entity. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An accounting method comprising:

enabling, by a computing system for a user, access to said computing system, wherein said computing system comprises a memory system, wherein said user is associated with a first entity and a second entity, wherein said first entity is a first governing corporation associated with said second entity, wherein said second entity is a dependent corporation with respect to said governing entity, wherein said second entity relies on said first entity for day to day operations and uses computing services, application systems, and underlying business processes of the first entity for a specified time period, wherein said user is a former employee of said first entity and a current employee of said second entity, wherein said memory system comprises data associated with said first entity and said second entity, and wherein said data comprises accounting data;

determining, by said computing system, that said second entity is dependent on said first entity for said specified time period, wherein said second entity comprises an entity that has been sold from said first entity to a third corporation;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, a set of account numbers for said allowable general ledger accounts, and a set of legal entities responsible for said allowable general ledger accounts, said second list associated with said second entity;

presenting, by said computing system to said user, said second list;

defining, by said computing system, profit centers representing an organizational structure for a portion of said second entity within a scope of a divestiture from said first entity;

receiving, by said computing system from said user, a second selection for a first general ledger account and associated account number from said second list, said first general ledger account associated with said first purchase type, a first profit center of said profit centers, and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form; and storing, by said computing system in said memory system, said accounting data input form comprising said first purchase type, said first selection, said second selection, and said third selection.

2. The method of claim 1, further comprising:
generating, by said computing system from said data, a fourth list comprising a second plurality of organizations associated with said first entity and said second entity;

presenting, by said computing system to said user, said fourth list;

receiving, by said computing system from said user, a fourth selection for a second organization from said fourth list, said fourth selection associated with said first entity and said second entity; and placing, by said computing system, said fourth selection into said accounting data input form.

3. The method of claim 1, wherein said generating said second list is based on said first configuration rules defined by said first entity and second configuration rules defined by said second entity.

4. The method of claim 1, further comprising:
transmitting, by said computing system, said accounting data input form to a general ledger system for processing.

5. A computing system comprising a processor coupled to a computer-readable memory unit, said memory unit comprising instructions that when executed by the processor implement an accounting method, said method comprising:

enabling, by said computing system for a user, access to said computing system, wherein said user is associated with a first entity and a second entity, wherein said first entity is a first governing corporation for said second entity, wherein said second entity is a dependent corporation with respect to said governing entity, wherein said second entity relies on said first entity for day to day operations and uses computing services, application systems, and underlying business processes of the first entity for a specified time period, wherein said user is a former employee of said first entity and a current employee of said second entity, wherein said computer-readable memory unit comprises data associated with said first entity and said second entity, and wherein said data comprises accounting data;

determining, by said computing system, that said second entity is dependent on said first entity for said specified time period, wherein said second entity comprises an entity that has been sold from said first entity to a third corporation;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, a set of account numbers for said allowable general ledger accounts, and a set of legal entities responsible for said allowable general ledger accounts, said second list associated with said second entity;

presenting, by said computing system to said user, said second list;

defining, by said computing system, profit centers representing an organizational structure for a portion of said second entity within a scope of a divestiture from said first entity;

receiving, by said computing system from said user, a second selection for a first general ledger account and associated account number from said second list, said first general ledger account associated with said first purchase type, a first profit center of said profit centers, and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form; and storing, by said computing system in said computer-readable memory unit, said accounting data input form comprising said first purchase type, said first selection, said second selection, and said third selection.

6. The computing system of claim 5, wherein said method further comprises:

generating, by said computing system from said data, a fourth list comprising a second plurality of organizations associated with said first entity and said second entity;

presenting, by said computing system to said user, said fourth list;

receiving, by said computing system from said user, a fourth selection for a second organization from said fourth list, said fourth selection associated with said first purchase type; and placing, by said computing system, said fourth selection into said accounting data input form.

7. The computing system of claim 5, wherein said generating said second list is based on said first configuration rules defined by said first entity and second configuration rules defined by said second entity.

8. The computing system of claim 5, wherein said method further comprises:

transmitting, by said computing system, said accounting data input form to a general ledger system for processing.

9. A computer program product, comprising a computer readable medium comprising a computer readable program code embodied therein, said computer readable program code adapted to implement an accounting method within a computing system comprising a computer-readable memory unit, said method comprising:

enabling, by said computing system for a user, access to said computing system, wherein said user is associated with a first entity and a second entity, wherein said first entity is a first governing corporation associated with said second entity, wherein said second entity is a dependent corporation with respect to said governing entity, wherein said second entity relies on said first entity for day to day operations and uses computing services, application systems, and underlying business processes of the first entity for a specified time period, wherein said user is a former employee of said first entity and a current employee of said second entity, wherein said computer-readable memory unit comprises data associated with said first entity and said second entity, and wherein said data comprises accounting data;

determining, by said computing system, that said second entity is dependent on said first entity for said specified time period, wherein said second entity comprises an entity that has been sold from said first entity to a third entity;

generating, by said computing system from said data, a first list comprising initially allowable purchase types for items available for purchase by said user, said determining said first list based on first configuration rules defined by said first entity;

generating, by said computing system from said first list, a modified list comprising allowable purchase types for items available for purchase by said user, said determining said modified list based on said second entity;

presenting, by said computing system to said user, said modified list;

receiving, by said computing system from said user, a first selection for a first purchase type from said modified list;

presenting, by said computing system to said user, an accounting data input form, said accounting data input form associated with said selection for said first purchase type from said modified list and said first configuration rules;

generating, by said computing system from said data, a second list comprising a plurality of allowable general ledger accounts, a set of account numbers for said allowable general ledger accounts, and a set of legal entities responsible for said allowable general ledger accounts, said second list associated with said second entity;

presenting, by said computing system to said user, said second list;

defining, by said computing system, profit centers representing an organizational structure for a portion of said second entity within a scope of a divestiture from said first entity;

receiving, by said computing system from said user, a second selection for a first general ledger account and associated account number from said second list, said first general ledger account associated with said first purchase type, a first profit center of said profit centers, and said first configuration rules;

generating, by said computing system from said data, a third list comprising a first plurality of organizations associated with said first entity and said second entity;

presenting, by said computing system to said user, said third list;

receiving, by said computing system from said user, a third selection for a first organization from said third list, said third selection associated with said first purchase type;

placing, by said computing system, said first purchase type, said first selection, said second selection, and said third selection into said accounting data input form; and storing, by said computing system in said computer-readable memory unit, said accounting data input form comprising said first purchase type, said first selection, said second selection, and said third selection.

10. The computer program product of claim 9, wherein said method further comprises:
   generating, by said computing system from said data, a fourth list comprising a second plurality of organizations associated with said first entity and said second entity;
   presenting, by said computing system to said user, said fourth list;
   receiving, by said computing system from said user, a fourth selection for a second organization from said fourth list, said fourth selection associated with said first purchase type; and
   placing, by said computing system, said fourth selection into said accounting data input form.

11. The computer program product of claim 9, wherein said generating said second list is based on said first configuration rules defined by said first entity and second configuration rules defined by said second entity.

12. The computer program product of claim 9, wherein said method further comprises:
   transmitting, by said computing system, said accounting data input form to a general ledger system for processing.

13. A process for supporting computer infrastructure, said process comprising providing at least one support service for at least one of creating, integrating, hosting, maintaining, and deploying computer-readable code in a computing system comprising a computer-readable memory unit, wherein the code in combination with the computing system is capable of performing an accounting method, said method comprising:
   enabling, by said computing system for a user, access to said computing system, wherein said user is associated with a first entity and a second entity, wherein said first entity is a first governing corporation associated with said second entity, wherein said second entity is a dependent corporation with respect to said governing entity, wherein said second entity relies on said first entity for day to day operations and uses computing services, application systems, and underlying business processes of the first entity for a specified time period, wherein said user is a former employee of said first entity and a current employee of said second entity, wherein said computer-readable memory unit comprises data associated with said first entity and said second entity, and wherein said data comprises accounting data;
   determining, by said computing system, that said second entity is dependent on said first entity for said specified time period, wherein said second entity comprises an entity that has been sold from said first entity to a third corporation;
   generating, by said computing system from said data, a first list comprising initially allowable purchase types for items available for purchase by said user, said determining said first list based on first configuration rules defined by said first entity;
   generating, by said computing system from said first list, a modified list comprising allowable purchase types for items available for purchase by said user, said determining said modified list based on said second entity;
   presenting, by said computing system to said user, said modified list;
   receiving, by said computing system from said user, a first selection for a first purchase type from said modified list;
   presenting, by said computing system to said user, an accounting data input form, said accounting data input form associated with said selection for said first purchase type from said modified list and said first configuration rules;
   generating, by said computing system from said data, a second list comprising a plurality of allowable general ledger accounts, a set of account numbers for said allowable general ledger accounts, and a set of legal entities responsible for said allowable general ledger accounts, said second list associated with said second entity;
   presenting, by said computing system to said user, said second list;
   defining, by said computing system, profit centers representing an organizational structure for a portion of said second entity within a scope of a divestiture from said first entity;
   receiving, by said computing system from said user, a second selection for a first general ledger account and associated account number from said second list, said first general ledger account associated with said first purchase type, a first profit center of said profit centers, and said first configuration rules;
   generating, by said computing system from said data, a third list comprising a first plurality of organizations associated with said first entity and said second entity;
   presenting, by said computing system to said user, said third list;
   receiving, by said computing system from said user, a third selection for a first organization from said third list, said third selection associated with said first purchase type;
   placing, by said computing system, said first purchase type, said first selection, said second selection, and said third selection into said accounting data input form; and
   storing, by said computing system in said computer-readable memory unit, said accounting data input form comprising said first purchase type, said first selection, said second selection, and said third selection.

14. The process of claim 13, wherein said method further comprises:
   generating, by said computing system from said data, a fourth list comprising a second plurality of organizations associated with said first entity and said second entity;
   presenting, by said computing system to said user, said fourth list;
   receiving, by said computing system from said user, a fourth selection for a second organization from said fourth list, said fourth selection associated with said first purchase type; and
   placing, by said computing system, said fourth selection into said accounting data input form.

15. The process of claim 13, wherein said generating said second list is based on said first configuration rules defined by said first entity and second configuration rules defined by said second entity.

16. The process of claim 13, wherein said method further comprises: transmitting, by said computing system, said accounting data input form to a general ledger system for processing.

* * * * *